(12) United States Patent
Nakata et al.

(10) Patent No.: US 9,739,910 B2
(45) Date of Patent: Aug. 22, 2017

(54) POLARIZING PLATE AND LIQUID CRYSTAL DISPLAY DEVICE

(71) Applicant: NITTO DENKO CORPORATION, Ibaraki-shi, Osaka (JP)

(72) Inventors: Mie Nakata, Ibaraki (JP); Shunsuke Murayama, Ibaraki (JP); Tomohiro Yamashita, Ibaraki (JP); Makiko Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/165,610

(22) Filed: May 26, 2016

(65) Prior Publication Data

US 2016/0349413 A1 Dec. 1, 2016

(30) Foreign Application Priority Data

May 28, 2015 (JP) .................................. 2015-108871

(51) Int. Cl.
*G02B 5/30* (2006.01)
*G02B 1/14* (2015.01)
(Continued)

(52) U.S. Cl.
CPC .................. *G02B 1/14* (2015.01); *G02B 1/16* (2015.01); *G02B 5/305* (2013.01); *G02B 5/3033* (2013.01);
(Continued)

(58) Field of Classification Search
CPC .......... G02B 1/14; G02B 1/16; G02B 5/3033; G02B 5/3083; G02B 5/305; G02F 1/133528; G02F 1/133638
(Continued)

(56) References Cited

U.S. PATENT DOCUMENTS

2006/0268208 A1* 11/2006 Murakami ........ G02F 1/133528
349/117
2008/0318072 A1* 12/2008 Kawabata .............. C08G 73/10
428/461

(Continued)

FOREIGN PATENT DOCUMENTS

JP 2009-139720 6/2009

*Primary Examiner* — Ricky D Shafer
(74) *Attorney, Agent, or Firm* — Westerman, Hattori, Daniels & Adrian, LLP

(57) ABSTRACT

A polarizing plate includes: a polyvinyl alcohol-based polarizer; and transparent protective films provided on both surfaces of the polyvinyl alcohol-based polarizer with an adhesive layer interposed between each of the transparent protective films and the polyvinyl alcohol-based polarizer. A first transparent protective film contains a (meth)acrylic resin and an ultraviolet absorber, the (meth)acrylic resin having an unsaturated carboxylic acid alkyl ester unit and a glutarimide unit represented by the general formula (1), having an imidization ratio of 2.5 to 5.0% and an acid value of 0.10 to 0.50 mmol/g, and having an acrylic ester unit of less than 1% by weight. A second transparent protective film contains a cycloolefin-based resin.

[Formula 1]

(1)

(Continued)

$R^1$ and $R^2$ each independently represent hydrogen or an alkyl group; and $R^3$ represents an alkyl group, a cycloalkyl group, or an aryl group.

10 Claims, 1 Drawing Sheet

(51) Int. Cl.
*G02B 1/16* (2015.01)
*G02F 1/1335* (2006.01)

(52) U.S. Cl.
CPC ...... *G02B 5/3083* (2013.01); *G02F 1/133528* (2013.01)

(58) Field of Classification Search
USPC ..... 359/487.01, 487.02, 489.07; 349/96, 117
See application file for complete search history.

(56) References Cited

U.S. PATENT DOCUMENTS

| | | | |
|---|---|---|---|
| 2010/0253884 A1* | 10/2010 | Katou | G02B 5/3033 349/96 |
| 2010/0309414 A1* | 12/2010 | Tomonaga | G02B 5/3041 349/96 |
| 2014/0045995 A1* | 2/2014 | Shimamoto | C08F 8/32 525/78 |
| 2014/0057060 A1* | 2/2014 | Fukagawa | G02F 1/133528 428/1.31 |
| 2016/0048057 A1* | 2/2016 | Sekiguchi | G02F 1/133528 349/61 |
| 2016/0062014 A1* | 3/2016 | Kagawa | G02B 5/3083 349/194 |
| 2016/0216421 A1* | 7/2016 | Nakata | G02B 1/14 |
| 2017/0031072 A1* | 2/2017 | Nakata | G02B 5/305 |

* cited by examiner

POLARIZING PLATE AND LIQUID CRYSTAL DISPLAY DEVICE

BACKGROUND OF THE INVENTION

Field of the Invention

The present invention relates to a polarizing plate and a liquid crystal display device.

Description of the Related Art

A liquid crystal display device uses liquid crystal switching to visualize the polarization state. Based on the display principle, the liquid crystal display device uses a polarizing plate in which a transparent protective film is bonded to each of both surfaces of a polarizer with an adhesive layer interposed therebetween. Iodine polarizers made of stretched polyvinyl alcohol to which iodine is adsorbed have high transmittance and high degree of polarization. Therefore, they are most popular polarizers widely used as the polarizer. A transparent protective film having a high water vapor permeability such as a triacetylcellulose film is used.

Image display devices such as a liquid crystal display device to which the polarizing plate is applied are used under various environments. Therefore, the polarizing plate is desired to have durabilities such as heat resistance under a high temperature environment and humidity resistance under a high humidity environment. However, the triacetylcellulose film usually used as the transparent protective film has a largely changed retardation under a high humidity environment, which disadvantageously causes display unevenness on a panel. On the other hand, there has been proposed a technique of reducing a water vapor permeability using a transparent protective film containing a (meth)acrylic resin, to suppress display unevenness (see Patent Document 1).

PRIOR ART DOCUMENT

Patent Document

Patent Document 1: JP-A-2009-139720

SUMMARY OF THE INVENTION

In recent years, mobile applications such as a mobile phone application, and on-vehicle applications or the like have been particularly developed. In these applications, the liquid crystal display device is placed under an outdoor environment in many cases. This may cause yellow discoloration (yellowing) on a display part under the influence of ultraviolet rays even in the liquid crystal display device using the technique. The liquid crystal display device is desired to satisfy environmental durability, and particularly ultraviolet durability.

Then, the present inventors have attempted to add an ultraviolet absorber to a transparent protective film made of a (meth)acrylic resin as yellow discoloration countermeasure to improve ultraviolet durability. However, it has been newly found that the transparent protective film which the ultraviolet absorber is added causes a poor appearance such as burnt deposit (minute black spots which seem to be burned) during film forming.

It is an object of the present invention to provide a polarizing plate which can suppress display unevenness and yellow discoloration even when being applied to a liquid crystal panel and prevent burnt deposit during film forming, and a liquid crystal display device including the polarizing plate.

As a result of earnest studies to solve the problems, the present inventors have found a polarizing plate to be described below, and the present invention has been accomplished.

That is, the present invention relates to a polarizing plate including:

a polyvinyl alcohol-based polarizer; and transparent protective films provided on both surfaces of the polyvinyl alcohol-based polarizer with an adhesive layer interposed between each of the transparent protective films and the polyvinyl alcohol-based polarizer, wherein:

the transparent protective films are a first transparent protective film and a second transparent protective film;

the first transparent protective film contains a (meth)acrylic resin and an ultraviolet absorber, the (meth)acrylic resin having an unsaturated carboxylic acid alkyl ester unit and a glutarimide unit represented by the general formula (1), having an imidization ratio of 2.5 to 5.0% and an acid value of 0.10 to 0.50 mmol/g, and having an acrylic ester unit of less than 1% by weight, and;

the second transparent protective film contains a cycloolefin-based resin,

[Formula 1]

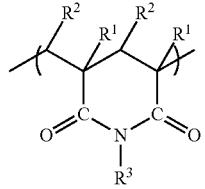

wherein:

$R^1$ and $R^2$ each independently represent hydrogen or an alkyl group having 1 to 8 carbon atoms; and $R^3$ represents an alkyl group having 1 to 18 carbon atoms, a cycloalkyl group having 3 to 12 carbon atoms, or an aryl group having 6 to 10 carbon atoms.

As the first transparent protective film provided on one surface of the polarizing plate, there is used a film containing a (meth)acrylic resin having an unsaturated carboxylic acid alkyl ester unit and a glutarimide unit. The (meth)acrylic resin having a low water vapor permeability can satisfy durabilities such as heat resistance under a high temperature environment and humidity resistance under a high humidity environment, and can suppress display unevenness to a low level even when the polarizing plate is applied to a liquid crystal panel.

In the polarizing plate, the first transparent protective film has the ultraviolet absorber, which can suitably prevent yellow discoloration largely caused under an outdoor environment.

Furthermore, in the polarizing plate, the (meth)acrylic resin which has an unsaturated carboxylic acid alkyl ester unit and a glutarimide unit is employed as a material for forming the first transparent protective film, and the imidization ratio and acid value of the (meth)acrylic resin, and the content of the acrylic ester unit are set into predetermined ranges. This suppresses the occurrence of burnt deposit during film forming caused by the addition of the ultraviolet absorber to allow the polarizing plate to have an excellent appearance.

In addition, in the polarizing plate, the second transparent protective film provided on the other surface is made of the cycloolefin-based resin, which can reduce the water vapor permeability of the polarizing plate to suppress display unevenness under high-temperature and high-humidity conditions.

In the polarizing plate, the in-plane retardation and thickness-direction retardation of the first transparent protective film are preferably 40 nm or less. This can provide the transparent protective film suitably used for the polarizing plate of the liquid crystal display device.

In the polarizing plate, the adhesive layer is preferably made of an active energy-ray curing-type adhesive. The active energy-ray curing-type adhesive generally has a low moisture content, which can suppress deterioration in the optical properties of the polarizing plate caused by moisture derived from the adhesive. The adhesive layer is cured by only the irradiation of the active energy ray, which can provide an improvement in the production efficiency of the polarizing plate.

The polarizing plate may include a coating layer disposed on one surface of the first transparent protective film. The coating layer may be a hard coat layer or an antifouling layer. Thereby, a function according to the kind of the coating layer can be applied to the polarizing plate.

The polarizing plate may include a pressure-sensitive adhesive layer provided on a surface of the transparent protective film opposite to the polarizer. The provision of the pressure-sensitive adhesive layer on the polarizing plate facilitates the lamination of the polarizing plate on other member, which can provide the multifunctional polarizing plate.

The polarizing plate may include an anchor layer provided between the polarizing plate and the pressure-sensitive adhesive layer. The provision of the anchor layer can provide a further improvement in tackiness.

In the polarizing plate, the pressure-sensitive adhesive layer may have conductivity, and the anchor layer may have conductivity. This can apply antistatic properties to the polarizing plate and the liquid crystal display device including the polarizing plate.

The present invention includes also a liquid crystal display device including the polarizing plate.

DETAILED DESCRIPTION OF THE PREFERRED EMBODIMENTS

Hereinafter, a polarizing plate according to one embodiment of the present invention will be described with reference to the drawings. In a part of or the entire drawings, some parts that are unnecessary for the description are omitted, and some parts are shown enlarged or shrunken to make the description easy.

<<Polarizing Plate>>

Figure 1:
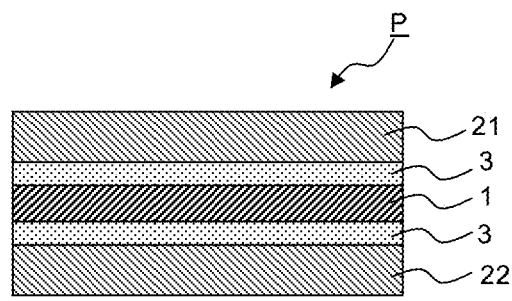
FIG. 1 is a sectional view schematically showing a polarizing plate according to one embodiment of the present invention.

As shown in FIG. 1, in a polarizing plate P, a first transparent protective film 21 and a second transparent protective film 22 are provided on both surfaces of a polyvinyl alcohol-based polarizer 1 with an adhesive layer 3 interposed between each of the films and the polyvinyl alcohol-based polarizer 1. The first transparent protective film 21 contains a (meth)acrylic resin which has an unsaturated carboxylic acid alkyl ester unit and a glutarimide unit, and an ultraviolet absorber. On the other hand, the second transparent protective film 22 is made of a cycloolefin-based resin.

<Polyvinyl Alcohol-Based Polarizer>

Any of various polarizers may be used as the polarizer 1 without particular limitation. Examples of the polarizer include a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified ethylene-vinyl acetate copolymer-based film, and uniaxially stretching the film, and a polyene-based oriented film such as a film of a dehydration product of polyvinyl alcohol or a dehydrochlorination product of polyvinyl chloride. Among these, a polarizer including a polyvinyl alcohol-based film and a dichroic material such as iodine is suitable. The thickness of the polarizer is generally, but not particularly limited to, about 5 to about 80 μm.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of boric acid or potassium iodide or the like. If necessary, the polyvinyl alcohol-based film may be further immersed in water for washing before the polyvinyl alcohol-based film is dyed. When the polyvinyl alcohol-based film is washed with water, dirt and an anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after the film is dyed with iodine. The film may also be stretched in an aqueous solution of boric acid, or potassium iodide or the like or in a water bath.

<First Transparent Protective Film>

The first transparent protective film 21 contains a (meth)acrylic resin having an unsaturated carboxylic acid alkyl ester unit and a glutarimide unit, and un ultraviolet absorber. The (meth)acrylic resin preferably has a structure unit including a glutarimide unit represented by the following general formula (1) and an unsaturated carboxylic acid alkyl ester unit represented by the following general formula (2).

[Formula 2]

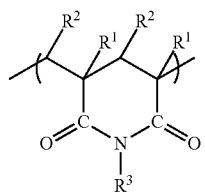

(1)

In the general formula (1), $R^1$ and $R^2$ each independently represent hydrogen or an alkyl group having 1 to 8 carbon atoms, and $R^3$ represents an alkyl group having 1 to 18 carbon atoms, a cycloalkyl group having 3 to 12 carbon atoms, or an aryl group having 6 to 10 carbon atoms.

[Formula 3]

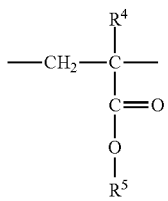
(2)

In the general formula (2), $R^4$ represents a hydrogen atom or an alkyl group having 1 to 5 carbon atoms. $R^5$ represents a hydrogen atom, or an aliphatic or alicyclic hydrocarbon group having 1 to 6 carbon atoms.

In the general formula (1), it is preferable that $R^1$ and $R^2$ each independently represent hydrogen or a methyl group, and $R^3$ is hydrogen, a methyl group, a butyl group, or a cyclohexyl group. It is more preferable that $R^1$ is a methyl group, $R^2$ is hydrogen, and $R^3$ is a methyl group.

The glutar(meth)acrylic resin may contain only a single glutarimide unit, or may contain a plurality of glutarimide units in which $R^1$, $R^2$, and $R^3$ in the general formula (1) are different.

The content by percentage of the glutarimide unit represented by the general formula (1) in the (meth)acrylic resin is preferably 5 to 50% by mole, more preferably 10 to 45% by mole, still more preferably 15 to 40% by mole, particularly preferably 20 to 35% by mole, and most preferably 25 to 35% by mole. When the content by percentage is less than 5% by mole, effects derived from the glutaric anhydride unit represented by the general formula (1), such as high optical property, high mechanical strength, adhesiveness with a polarizer, and a reduction in thickness may not be sufficiently exhibited. When the content by percentage is more than 50% by mole, for example, high heat resistance and high transparency may not be sufficiently exhibited.

The content by percentage of the unsaturated carboxylic acid alkyl ester unit represented by the general formula (2) in the (meth)acrylic resin is preferably 50 to 95% by mole, more preferably 55 to 90% by mole, still more preferably 60 to 85% by mole, particularly preferably 65 to 80% by mole, and most preferably 65 to 75% by mole. When the content by percentage is less than 50% by mole, effects derived from the unsaturated carboxylic acid alkyl ester unit represented by the general formula (2), such as high heat resistance and high transparency may not be sufficiently exhibited. When the content by percentage is more than 95% by mole, the resin is brittle so as to be easily cracked so that the resin cannot sufficiently exhibit high mechanical strength. Thus, the resin may be poor in productivity.

The (meth)acrylic resin having a glutarimide unit represented by the general formula (1) and an unsaturated carboxylic acid alkyl ester unit represented by the general formula (2) can be basically manufactured by the following method.

That is, the (meth)acrylic resin can be obtained by copolymerizing an unsaturated carboxylic acid alkyl ester monomer corresponding to the unsaturated carboxylic acid alkyl ester unit represented by the general formula (2) with an unsaturated carboxylic acid monomer and/or a precursor monomer thereof to obtain a copolymer (a), treating the copolymer (a) with an imidization agent to conduct an intramolecular imidization reaction between the unsaturated carboxylic acid alkyl ester monomer unit in the copolymer (a) and the unsaturated carboxylic acid monomer and/or the precursor monomer unit thereof, and then introducing the glutarimide unit represented by the general formula (1) into the copolymer.

Examples of the unsaturated carboxylic acid alkyl ester include methyl(meth)acrylate, ethyl(meth)acrylate, n-propyl(meth)acrylate, n-butyl(meth)acrylate, t-butyl(meth)acrylate, n-hexyl(meth)acrylate, cyclohexyl(meth)acrylate, chloromethyl(meth)acrylate, 2-chloroethyl(meth)acrylate, 2-hydroxyethyl(meth)acrylate, 3-hydroxypropyl(meth)acrylate, 2,3,4,5,6-pentahydroxyhexyl(meth)acrylate, and 2,3,4,5-tetrahydroxypentyl(meth)acrylate. These may be used alone or in combination of two or more thereof. Of these, methyl(meth)acrylate is more preferable and methyl methacrylate is particularly preferable since the compounds are excellent in thermal stability. That is, it is particularly preferable that in the general formula (1), $R^4$ is a methyl group and $R^5$ is a methyl group.

Examples of the unsaturated carboxylic acid monomer include acrylic acid, methacrylic acid, crotonic acid, α-substituted acrylic acid, and α-substituted methacrylic acid. Examples of the precursor monomer thereof include acryl amide and methacryl amide. The unsaturated carboxylic acid monomer or the precursor monomer thereof may be used alone or in combination of two or more thereof. Of these, it is particularly preferable that the unsaturated carboxylic acid monomer is acrylic acid and methacrylic acid, and the precursor monomer is acryl amide since the compounds cause the effects of the present invention to be sufficiently exhibited.

The method for treating the copolymer (a) with the imidization agent is not particularly limited, and any conventionally known methods can be used. For example, the copolymer (a) can be imidized by a method using an extruder, a batch type reaction vessel (pressure vessel) or the like. When the copolymer (a) is heat-melted using the extruder and treated with the imidization agent, the extruder to be used is not particularly limited, and various extruders can be used. Specifically, a single-screw extruder, a twin-screw extruder, a multi-screw extruder or the like can be used, for example. When the copolymer (a) is treated with the imidization agent using the batch type reaction vessel (pressure vessel), the structure of the batch type reaction vessel (pressure vessel) is not particularly limited.

The imidization agent is not particularly limited as long as the agent can generate the glutarimide unit represented by the general formula (1). Specific examples thereof include: aliphatic hydrocarbon group-containing amines such as methylamine, ethylamine, n-propylamine, i-propylamine, n-butylamine, i-butylamine, tert-butylamine, and n-hexylamine; aromatic hydrocarbon group-containing amines such as aniline, benzylamine, toluidine, and trichloroaniline; and alicyclic hydrocarbon group-containing amines such as cyclohexylamine.

It is also possible to use a urea compound, which generates the amines mentioned above upon being heated, such as urea, 1,3-dimethyl urea, 1,3-diethyl urea, and 1,3-dipropyl urea.

Among the imidization agents mentioned above, it is preferable to use methylamine, ammonia, and cyclohexylamine in view of the cost and physical properties, and it is particularly preferable to use methylamine.

In the imidization step, a ring-closing accelerator may be added if needed in addition to the imidization agent.

In the imidization step, the amount of the imidization agent is preferably 0.5 to 10 parts by weight, and more preferably 0.5 to 6 parts by weight based on 100 parts by weight of the copolymer (a). When the imidization agent is added in an amount of less than 0.5 part by weight, the imidization ratio of a resin composition to be finally obtained is decreased, which may cause remarkable deterioration in heat resistance thereof to induce appearance defects such as burnt deposit after the resin composition is molded. When the imidization agent is added in an amount of more than 10 parts by weight, the imidization agent remains in the resin, which may induce appearance defects such as burnt deposit after the resin composition is molded, and foaming.

The manufacturing method of the present embodiment includes a step of performing treatment using an esterification agent in addition to the imidization step.

Examples of the esterification agent include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluenesulfonate, methyl trifluoromethylsulfonate, methyl acetate, methanol, ethanol, methyl isocyanate, p-chlorophenyl isocyanate, dimethylcarbodiimide, dimethyl-t-butylsilylchloride, isopropenyl acetate, dimethylurea, tetramethylammonium hydroxide, dimethyl diethoxysilane, tetra-N-butoxysilane, dimethyl(trimethylsilane) phosphite, trimethyl phosphite, trimethyl phosphate, tricresyl phosphate, diazomethane, ethylene oxide, propylene oxide, cyclohexene oxide, 2-ethylhexylglycidyl ether, phenyl glycidyl ether, and benzyl glycidyl ether. Among them, dimethyl carbonate is preferred from the viewpoint of cost and reactivity or the like, The additive amount of the esterification agent is not particularly limited, and is set so that the acid value of the (meth)acrylic resin is a desired value.

The (meth)acrylic resin of the present embodiment contains the glutarimide unit represented by the general formula (1) and the unsaturated carboxylic acid alkyl ester unit, and has a specific imidization ratio, a specific acid value, and a specific acrylic ester unit content.

The imidization ratio in the (meth)acrylic resin is represented by the ratio between the glutarimide unit and the unsaturated carboxylic acid alkyl ester unit. Therefore, the "imidization ratio" refers to the proportion of the imide carbonyl groups in the whole carbonyl groups. The ratio can be measured by the NMR spectrum or IR spectrum of the (meth)acrylic resin, or other methods, for example. The imidization ratio in the present embodiment is obtained by subjecting a resin to $^1$H-NMR measurement using $^1$HNMR BRUKER AvanceIII (400 MHZ). When an area of a peak derived from the O—CH$_3$ proton of the unsaturated carboxylic acid alkyl ester near 3.5 to 3.8 ppm is defined as A, and an area of a peak derived from the N—CH$_3$ proton of glutarimide near 3.0 to 3.3 ppm is defined as B, the ratio is obtained according to the following formula.

$$Im \% = \{B/(A+B)\} \times 100$$

The imidization ratio is preferably 2.5 to 5.0%. An imidization ratio within the above range prevents deterioration in the heat resistance, transparency, molding processability, and mechanical strength of the (meth)acrylic resin to be obtained, and generation of burnt deposit when the (meth)acrylic resin is processed into the film. In contrast, an imidization ratio of less than 2.5% tends to cause burnt deposit when the first transparent protective film is formed, insufficient heat resistance of the (meth)acrylic resin to be obtained, and impaired transparency. An imidization ratio of more than 5.0% also tends to cause burnt deposit, unnecessarily high heat resistance and melt viscosity, deterioration in molding processability, extremely low mechanical strength during film processing, and impaired transparency.

The acid value of the (meth)acrylic resin of the present embodiment represents the content of a carboxylic acid unit or a carboxylic anhydride unit in the (meth)acrylic resin. The acid value can be calculated by, for example, a titration method described in WO 2005-054311, or a titration method described in JP-A-2005-23272.

The acid value of the (meth)acrylic resin is 0.10 to 0.50 mmol/g. An acid value within the above range can provide a (meth)acrylic resin having an excellent balance of heat resistance, mechanical properties, and molding processability. In contrast, for example, an acid value of more than 0.50 mmol/g tends to easily cause foaming of a resin when the resin is melted and extruded, deterioration in molding processability, and deterioration in productivity of a molded article. An acid value of less than 0.10 mmol/g makes it necessary to use a larger amount of a denaturating agent for adjusting the acid value. This may cause cost increase or induce generation of a gel-like material due to the residual denaturating agent, which is not preferable.

The amount of the acrylic ester unit contained in the (meth)acrylic resin of the present embodiment is less than 1% by weight, and preferably less than 0.5% by weight. An acrylic ester unit within the above range provides a (meth)acrylic resin having excellent thermal stability. An amount of more than 1% by weight tends to cause deterioration in thermal stability, and a decrease in the molecular weight and viscosity of a resin when the resin is manufactured or molded, to cause deterioration in physical properties.

The (meth)acrylic resin may contain units other than the glutarimide unit represented by the general formula (1) and the unsaturated carboxylic acid alkyl ester unit represented by the general formula (2).

For example, the (meth)acrylic resin may contain 0 to 10% by weight of units which are not involved in the intermolecular imidization reaction and originate from the unsaturated carboxylic acid monomer. The proportion of the units originating from the unsaturated carboxylic acid is more preferably 0 to 5% by weight, and even more preferably 0 to 1% by weight. When the proportion of the units originating from the unsaturated carboxylic acid monomer in the (meth)acrylic resin is set to 10% by weight or less, the colorless transparency, the retention stability, and the humidity resistance can be maintained.

The (meth)acrylic resin of the present embodiment may contain a copolymerizable vinyl-based monomer unit other than the above. Examples of the other vinyl-based monomer include acrylonitrile, methacrylonitrile, ethacrylonitrile, allyl glycidyl ether, maleic anhydride, itaconic anhydride, N-methylmaleimide, N-ethylmaleimide, N-cyclohexylmaleimide, aminoethyl acrylate, propylaminoethyl acrylate, dimethylaminoethyl methacrylate, ethylaminopropyl methacrylate, cyclohexylaminoethyl methacrylate, N-vinyldiethylamine, N-acetylvinylamine, allylamine, methaallylamine, N-methylallylamine, 2-isopropenyl-oxazoline, 2-vinyl-oxazoline, 2-acroyl-oxazoline, N-phenylmaleimide, phenylaminoethyl methacrylate, styrene, α-methylstyrene, p-glycidylstyrene, p-aminostyrene, and 2-styryl-oxazoline. These may be used alone or in combination of two or more thereof.

About styrene, α-methylstyrene or any other styrene based structural unit, out of the above-mentioned other vinyl monomers, the content proportion is preferably 0 to 1% by weight, and more preferably 0 to 0.1% by weight. When the content concentration of the styrene based structural unit is set into the range of 0 to 1% by weight, deterioration in the retardation and a decrease in the transparency can be prevented.

The weight-average molecular weight of the (meth) acrylic resin is preferably 1000 to 2000000, more preferably 5000 to 1000000, even more preferably 10000 to 500000, particularly preferably 50000 to 500000, and most preferably 60000 to 150000. When the weight-average molecular weight is outside the range, the advantageous effects of the invention may fail to be sufficiently exhibited. The weight-average molecular weight is obtained in terms of polystyrene using a gel permeation chromatograph (GPC system, manufactured by Tosoh Corporation). Tetrahydrofuran is used as a solvent.

The Tg (glass transition temperature) of the (meth)acrylic resin is preferably 110° C. or higher, more preferably 115° C. or higher, even more preferably 120° C. or higher, particularly preferably 125° C. or higher, and most preferably 130° C. or higher. When the Tg is 110° C. or higher, for example, the film easily turns excellent in durability when the film is finally incorporated into a polarizing plate. The upper limit of the Tg of the (meth)acrylic resin is not particularly limited, and is preferably 300° C. or lower, more preferably 290° C. or lower, even more preferably 285° C. or lower, particularly preferably 200° C. or lower, and most preferably 160° C. or lower from the viewpoint of moldability or the like.

As the overall light ray transmittance of a molded product from the (meth)acrylic resin by injection molding is higher, the (meth)acrylic resin is more preferable. The transmittance is measured by a method in accordance with ASTM-D-1003. The transmittance is preferably 85% or more, more preferably 88% or more, and even more preferably 90% or more. When the overall light ray transmittance is less than 85%, the transparency falls so that the resin may fail to be used for a proper use purpose.

The content of the (meth)acrylic resin in the first transparent protective film is preferably 50 to 100% by weight, more preferably 60 to 100% by weight, even more preferably 70 to 100% by weight, and particularly preferably 80 to 100% by weight. When the content of the (meth)acrylic resin in the transparent protective film of the present invention is less than 50% by weight, high heat resistance and high transparency that the (meth)acrylic resin originally has may fail to be sufficiently reflected.

Examples of the resin which can be used together with the (meth)acrylic resin in the first transparent protective film of the present embodiment include thermoplastic resins such as polyethylene, polypropylene, polyamide, polyphenylenesulfide, polyetheretherketone, polyester, polysulfone, polyphenylene oxide, polyacetal, polyimide and polyetherimide, and thermosetting resins such as a phenol-based resin, a melamine-based resin, a polyester-based resin, a silicone-based resin, and an epoxy-based resin. These are blended so as not to damage the object of the present invention.

Among these, the first transparent protective film contains an ultraviolet-ray absorber as well as the (meth)acrylic resin. The first transparent protective film including a specific structure unit, and having a specific imidization ratio, a specific acid value, and a specific acrylic ester unit content of the present embodiment can suppress the yellow discoloration of the polarizing plate while preventing conventionally-offending burnt deposit caused by the ultraviolet-ray absorber during film forming. Specific examples of the ultraviolet-ray absorber include an oxybenzophenone compound, a benzotriazole compound, a salicylate ester compound, a benzophenone compound, a cyanoacrylate compound, a nickel complex salt compound, and a triazine compound that are conventionally known. Examples of methods for imparting the ultraviolet-ray absorber to the first transparent protective film include a method of adding an ultraviolet-ray absorber into the first transparent protective film and a method of laminating a layer containing an ultraviolet-ray absorber as a constituent layer of the first transparent protective film.

The content of the ultraviolet-ray absorber in the first transparent protective film may be appropriately adjusted so that the objective yellow discoloration preventing effect is obtained. When the content of the ultraviolet-ray absorber is too low, the yellow discoloration preventing effect may be insufficient. On the contrary, when the content of the ultraviolet-ray absorber is too high, the burnt deposit may be insufficiently suppressed or the ultraviolet-ray absorber may bleed out.

The above other resins and the above additives may be blended with raw materials for forming the (meth)acrylic resin when the (meth)acrylic resin is manufactured, or may be blended after the (meth)acrylic resin is manufactured.

The transparent protective film containing the (meth) acrylic resin of the present invention is usually obtained by forming the (meth)acrylic resin into a film according to a casting method, an injection molding method, and a melt-extrusion molding method. The obtained film can be uniaxially or biaxially stretched in order to increase the film strength.

The transparent protective film containing the (meth) acrylic resin hardly exhibits a retardation in an unstretched state. When the transparent protective film is stretched, the film exhibits a retardation. When the transparent protective film is stretched, the retardation can be controlled by a stretching ratio and by adding a retardation control agent. The retardation control agent is preferably a styrene-based resin, and particularly preferably an acrylonitrile-styrene copolymer.

The first transparent protective film according to the present embodiment preferably has small optical anisotropy. Particularly, the first transparent protective film preferably has small optical anisotropy not only in its in-plane directions (length direction, width direction) but also in its thickness direction. In other words, both the in-plane retardation and the thickness-direction retardation are preferably small.

Specifically, the in-plane retardation and thickness-direction retardation of the first transparent protective film are preferably 40 nm or less, and more preferably 20 nm or less. According to the constitution having such optical properties, the transparent protective film according to the present embodiment can be suitably used as a polarizer protective film included in the polarizing plate of a liquid crystal display device. On the other hand, when the in-plane retardation of the film exceeds 40 nm or the thickness-direction retardation exceeds 40 nm, a problem such as a reduction in the contrast of the liquid crystal display device may occur when the transparent protective film according to the present embodiment is used in a state where the transparent protective film is included in the polarizing plate of the liquid crystal display device.

The in-plane retardation (Re) and the thickness-direction retardation (Rth) can be calculated by the following formulae, respectively. That is, in the case of an ideal film which is completely optically isotropic in three-dimensional directions, its in-plane retardation Re and thickness-direction retardation Rth are both 0.

$$Re = (nx - ny) \times d$$

$$Rth = (nx - nz) \times d$$

In the above formulae, a direction in which an in-plane refractive index becomes maximum is defined as an X axis; a direction orthogonal to the X axis is defined as a Y axis;

and the thickness direction of a film is defined as a Z axis. nx, ny, and nz represent refractive indexes in X, Y, and Z axis directions, respectively. Furthermore, d represents the thickness (nm) of the film.

The transparent protective film containing a (meth)acrylic resin which has an unsaturated carboxylic acid alkyl ester unit and a glutaric anhydride unit of the present embodiment can satisfy a water vapor permeability of 300 $g/m^2$ or less, which is preferable from the viewpoint of durability. The water vapor permeability is more preferably 250 $g/m^2$ or less, and even more preferably 200 $g/m^2$ or less.

One or more arbitrary appropriate additives may be contained in the first transparent protective film used in the present embodiment. Another examples of the additive include hindered phenol-based, phosphorus-based, and sulfur-based antioxidants; stabilizers such as a light stabilizer, a weathering stabilizer, and a heat stabilizer; reinforcing materials such as glass fibers and carbon fibers; near infrared ray absorbing agents; flame retardants such as tris(dibromopropyl) phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; and a flame retardant.

The content proportion of the additive in the first transparent protective film of the present embodiment is preferably 0 to 5% by weight, more preferably 0 to 2% by weight, and even more preferably 0 to 0.5% by weight.

<Second Transparent Protective Film>

In the present embodiment, a second transparent protective film contains a cycloolefin-based resin as a main raw material. Thereby, the second transparent protective film can exhibit characteristics such as high transparency and low water-absorbing properties.

The cycloolefin-based resin forming a second transparent protective film 22 is not particularly limited as far as the resin is a resin having units of a monomer made of a cyclic olefin (cycloolefin). The cycloolefin-based resin used for the second transparent protective film 22 may be either a cycloolefin polymer (COP) or a cycloolefin copolymer (COC). The cycloolefin copolymer means an amorphous cyclic olefin-based resin which is a copolymer of a cyclic olefin and olefin such as ethylene.

As the cyclic olefin, a polycyclic cyclic olefin and a monocyclic cyclic olefin exist. Examples of the polycyclic cyclic olefin include norbornenes such as norbornene, methyl norbornene, dimethyl norbornene, ethyl norbornene, ethylidene norbornene, and butyl norbornene; dicyclopentadienes such as dicyclopentadiene, dihydrodicyclopentadiene, methyl dicyclopentadiene, and dimethyl dicyclopentadiene; tetracyclododecenes such as tetracyclododecene, methyltetracyclododecene, and dimethyltetracyclo dodecene; and cyclopentadiene polymers such as tricyclopentadiene and tetracyclopentadiene. Examples of the monocyclic cyclic olefin include cyclobutene, cyclopentene, cyclooctene, cyclooctadiene, cyclooctatriene, and cyclododecatriene. Among these, from the viewpoint of transparency, humidity resistance, and retardation control, the norbornenes are preferred.

The second transparent protective film made of the above cycloolefin-based resin is available also as a commercially available optical film. Examples of the second transparent protective film include Topas manufactured by Ticona, Arton manufactured by JSR Corporation, Zeonor and Zeonex manufactured by Zeon Corporation, and Apel manufactured by Mitsui Chemicals, Inc.

The surface of the second transparent protective film 22 may be previously subjected to sputtering, corona discharge, flame treatment, ultraviolet irradiation, electron beam irradiation, chemical treatment, oxidation, or other etching or undercoating treatment so that the second transparent protective film can have improved tackiness to the adhesive layer formed thereon.

The second transparent protective film 22 may have no retardation. For example, the second transparent protective film 22 may be a retardation plate having an appropriate retardation in accordance with a use purpose such as a purpose of compensation for coloration based on the birefringence of various wavelength plates or liquid crystal layers or for the viewing angle or the like. When the second transparent protective film 22 has a retardation, a second transparent protective film having a different retardation from that of the film may be laminated on the second transparent protective film 22 to control optical properties such as a retardation.

When the second transparent protective film 22 has a retardation, the second transparent protective film 22 satisfying the relation of nx=ny>nz, nx>ny>nz, nx>ny=nz, nx>nz>ny, nz=nx>ny, nz>nx>ny, or nz>nx=ny may be selected and used depending on various applications. For example, when the second transparent protective film 22 satisfies the relation of the refractive index of nx>ny>nz, the viewing angle properties in an oblique direction can be improved. The second transparent protective film 22 can be suitably applied for the IPS mode or VA mode liquid crystal display device.

For example, the second transparent protective film satisfying the relation of nx>ny>nz to be used preferably has an in-plane retardation of 40 to 300 nm, and more preferably 40 to 100 nm, a thickness-direction retardation of 80 to 320 nm, and more preferably 100 to 320 nm, and an Nz coefficient of 1.8 to 4.5. For example, the second transparent protective film satisfying the relation of nx>ny=nz (positive A plate) to be used preferably has an in-plane retardation of 100 to 200 nm. For example, the second transparent protective film satisfying the relation of nz=nx>ny (negative A plate) to be used preferably has an in-plane retardation of 100 to 200 nm. For example, the second transparent protective film satisfying the relation of nx>nz>ny to be used preferably has an in-plane retardation of 150 to 300 nm and an Nz coefficient of more than 0 and 0.7 or less. As described above, for example, the second transparent protective film satisfying the relation of nx=ny>nz, nz>nx>ny, or nz>nx=ny may be used. The Nz coefficient is represented by the formula Nz=(nx−nz)/(nx−ny) wherein nx, ny, and nz represent refractive indexes in X, Y, and Z axis directions, respectively when a direction in which an in-plane refractive index becomes maximum is defined as an X axis; a direction orthogonal to the X axis is defined as a Y axis; and the thickness direction of a film is defined as a Z axis.

These retardations can be controlled by uniaxially or biaxially stretching a polymer film containing a cycloolefin-based resin in a lengthwise direction or a transverse direction. The second transparent protective film can be obtained by a method for adhering a shrinkable film to one surface or both surfaces of a polymer film to form a laminate, and subjecting the laminate to heat-stretching treatment.

One or more arbitrary appropriate additives may be contained in the second transparent protective film used in the present embodiment. The additive and content thereof shown in Paragraph of the first transparent protective film can be suitably used as the other additive (including an ultraviolet absorber) and the content thereof.

The thicknesses of the first transparent protective film and second transparent protective film of the present embodiment can be appropriately determined. Generally, the thicknesses are independently about 1 to about 500 μm, preferably about 1 to about 300 μm, and more preferably about 5 to about 200 μm from the viewpoint of a strength, workability such as handleability, requirement for a thin film, and transparency or the like.

<Coating Layer>

Various coating layers 5 such as a hard coat layer, an antifouling layer, an antireflection layer, a sticking prevention layer, a diffusion layer and an anti-glare layer may be provided on the surface on which the polarizer of the above described transparent protective film has not been adhered.

The hard coat layer is applied for the purpose of protecting the surface of the polarizing plate from damage. The hard coat layer may be formed by a method in which, for example, a curable coated film having excellent hardness and slide properties or the like is added on the surface of the transparent protective film using appropriate ultraviolet-ray curing type resins such as acrylic type and silicone type resins. The antifouling layer is applied for the purpose of preventing the dirt of the surface of the polarizing plate. The antireflection layer is applied for the purpose of antireflection of outdoor daylight on the surface of the polarizing plate. The antireflection layer may be prepared by forming an antireflection film or the like according to the conventional method. The sticking prevention layer is applied for the purpose of adherence prevention with adjoining layer.

The anti-glare layer is applied in order to prevent a disadvantage that outdoor daylight reflects on the surface of the polarizing plate to disturb visual recognition of transmitting light through the polarizing plate. The anti-glare layer may be formed, for example, by applying a fine concavo-convex structure to a surface of the transparent protective film using, for example, an appropriate method such as rough surfacing treatment method by sandblasting or embossing or a method of combining transparent fine particles. As fine particles contained in order to form the fine concavo-convex structure on the above-mentioned surface, transparent fine particles having an average particle size of 0.5 to 50 μm, for example, such as inorganic type fine particles which may have conductivity and be made of silica, alumina, titania, zirconia, tin oxide, indium oxide, cadmium oxide, and antimony oxide or the like, and organic type fine particles made of cross-linked or non-cross-linked polymers or the like may be used. When forming the fine concavo-convex structure on the surface, the amount of fine particles to be used is usually about 2 to about 50 parts by weight, and preferably 5 to 25 parts by weight, based on 100 parts by weight of the transparent resin which forms the fine concavo-convex structure on the surface. The anti-glare layer may serve as a diffusion layer (viewing angle expanding function or the like) for diffusing transmitting light through the polarizing plate and expanding a viewing angle or the like.

The above-mentioned antireflection layer, sticking prevention layer, diffusion layer, and anti-glare layer or the like may be provided on the transparent protective film itself, and also they may be provided as an optical layer different from the transparent protective film.

(Adhesive Layer)

The adhesive layer used to bond the polarizer to the transparent protective film is not particularly limited as long as the adhesive layer is optically transparent. The adhesive layer used is of any form of various forms such as a water-based adhesive layer, a solvent-based adhesive layer, a hot-melt adhesive layer, and an active energy-ray curing-type adhesive layer. The water-based adhesive or the active energy-ray curing-type adhesive is preferable, and the active energy-ray curing-type adhesive is more preferable.

<Water-Based Adhesive>

Examples of the water-based adhesive used to form the adhesive layer include, but are not particularly limited to, a vinyl polymer-based adhesive, a gelatin-based adhesive, a vinyl-based adhesive, a latex-based adhesive, a polyurethane-based adhesive, an isocyanate-based adhesive, a polyester-based adhesive, and an epoxy-based adhesive.

When the adhesive layer is made of the water-based adhesive or the like, the thickness of the adhesive layer is about 10 to about 300 nm. The thickness of the adhesive layer is more preferably 10 to 200 nm, and even more preferably 20 to 150 nm from the viewpoint of obtaining a uniform in-plane thickness and sufficient adhesive force.

After the water-based adhesive is coated, the polarizer is bonded to the transparent protective film with a roll laminator or the like. The adhesive may be coated on one or both of the transparent protective film and the polarizer. After bonding, a drying step is performed to form an adhesive layer which is a dry coated layer. A drying temperature is about 5 to about 150° C., and preferably 30 to 120° C. for a time of 120 sec or longer, and preferably for a time of 300 sec or longer.

(Active Energy-Ray Curing-Type Adhesive)

Examples of the active energy-ray curing-type adhesive include curing-type adhesives cured by the irradiation of electron-beam curing-type or ultraviolet-ray curing-type active energy rays.

Examples of the curable component of the active energy-ray curing-type adhesive include (meth)acryloyl group-containing compounds and vinyl group-containing compounds. These curable components may be monofunctional or bi- or poly-functional. These curable components may be used alone or in combination of two or more. Preferred examples of the curable component include (meth)acryloyl group-containing compounds. Specific examples thereof include various epoxy (meth)acrylates, urethane (meth)acrylates, polyester (meth)acrylates, and various (meth)acrylate-based monomers.

When the (meth)acryloyl group-containing compounds, and particularly monofunctional (meth)acrylate having an aromatic ring and a hydroxy group, nitrogen-containing (meth)acrylate, and carboxyl group-containing (meth)acrylate are used as the curable component, the curable component is suitable as the active energy-ray curing-type adhesive. A polarizing plate having good adhesion to the polarizer and the transparent protective film is obtained by using the adhesive. For example, the adhesive of the present embodiment can exhibit good adhesion to both a low-moisture-content polarizer and a transparent protective film produced with a low-moisture-permeability material so that the resulting polarizing plate having a high level of dimensional stability is obtained.

The use of the curable component described above allows the production of polarizing plates whose dimensions are less changeable and thus can facilitate upsizing of polarizing plates and keep the manufacturing cost low from the viewpoint of yield and the number of available pieces. The polarizing plate obtained in the present embodiment has a high level of dimensional stability and thus can reduce unevenness caused by external heat from a backlight in an image display device.

Besides the above, examples of (meth)acryloyl group-containing compounds include C1 to C12 alkyl(meth)acrylates such as methyl(meth)acrylate, ethyl(meth)acrylate, n-butyl(meth)acrylate, 2-ethylhexyl(meth)acrylate, isooctyl (meth)acrylate, isononyl(meth)acrylate, and lauryl(meth) acrylate; alkoxyalkyl(meth)acrylate monomers such as methoxyethyl(meth)acrylate and ethoxyethyl(meth)acrylate; hydroxyl group-containing monomers such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate; acid anhydride group-containing monomers such as maleic anhydride and itaconic anhydride; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

The curable component used may be a bifunctional or polyfunctional curable component. The bifunctional or polyfunctional curable component is preferably a bifunctional or polyfunctional (meth)acrylate, and particularly preferably a bifunctional or polyfunctional epoxy (meth)acrylate. The bifunctional or polyfunctional epoxy (meth)acrylate is obtained by the reaction between (meth)acrylic acid and a polyfunctional epoxy compound. The polyfunctional epoxy compound may be of any type. Examples of the polyfunctional epoxy compound include an aromatic epoxy resin, an alicyclic epoxy resin, and an aliphatic epoxy resin.

In addition to the curable component, the curing-type adhesive preferably contains a radical initiator depending on the type of the curing. When the adhesive used is of an electron-beam curing-type, it is not particularly necessary to add the radical initiator to the adhesive. However, when the adhesive used is of an ultraviolet-ray curing-type, the radical initiator is suitably used.

When the adhesive layer is made of the curing-type adhesive, the thickness of the adhesive layer is preferably 0.1 to 20 μm, more preferably 0.2 to 10 μm, and even more preferably 0.3 to 8 μm. When the thickness is small, a cohesive force provided by an adhesive force itself is not obtained, which may fail to provide adhesive strength. The thickness of the adhesive layer exceeding 20 μm causes a cost increase, and cure shrinkage of the adhesive itself, which may cause the adverse influence on the optical properties of the polarizing plate.

After the polarizer and the transparent protective film are bonded, the adhesive is cured by the irradiation of active energy rays or the like. The adhesive may be irradiated with the active energy rays in any suitable direction. When the active energy rays are ultraviolet rays, the adhesive is preferably irradiated with the active energy rays from the second transparent protective film side in view of the first transparent protective film containing the ultraviolet absorber. However, in this case, the irradiation level of the active energy rays preferably causes no deterioration of the polarizer by ultraviolet rays.

As long as the irradiation condition of the active energy rays can cure the adhesive, any suitable conditions can be employed. As the irradiated active energy rays, ultraviolet rays having an exposure dose of 100 mJ/cm$^2$ or more, and preferably 100 mJ/cm$^2$ to 3000 mJ/cm$^2$ can be used. At a too small exposure dose, the adhesive may be insufficiently cured. A too large exposure dose may damage the transparent protective film or the polarizer and causes yellow discoloration or a reduction in mechanical strength, which may make it impossible to obtain the desired optical properties.

Examples of methods for adjusting the thickness of the adhesive layer include, but are not particularly limited to, methods including adjusting the solid concentration of an adhesive solution or adjusting an adhesive coater. The method for measuring the thickness of the adhesive layer is not particularly limited, and cross-sectional observation measurement by SEM (Scanning Electron Microscopy) or TEM (Transmission Electron Microscopy) is preferably used. The coating operation of the adhesive is not particularly limited, and various coaters and various means such as roll methods, spraying methods, and immersion methods may be employed.

When the manufacturing method is performed using a continuous line, the line speed is preferably 1 to 500 m/min, more preferably 5 to 300 m/min, and even more preferably 10 to 100 m/min, depending on the time required to cure the adhesive. When the line speed is too low, the productivity is low, or damage to the transparent protective film is too much, which can make it impossible to produce a polarizing plate capable of withstanding durability tests or the like. When the line speed is too high, the adhesive is insufficiently cured, so that the desired adhesion may fail to be obtained.

The adhesive may also contain a metal compound filler. The metal compound filler can be used to control the fluidity of the adhesive layer and to stabilize the film thickness so that a polarizing plate with a good appearance and in-plane uniformity can be obtained with no unevenness in adhesion.

The polarizing plate is obtained by bonding the transparent protective film to each of both surfaces of the polarizer with the adhesive layer interposed therebetween. An undercoat layer and an adhesion facilitating layer or the like may be provided between the adhesive layer and the transparent protective film or the polarizer. Examples of adhesion facilitating treatments include dry treatments such as plasma treatment and corona treatment; chemical treatments such as alkaline treatment (saponification); and coating treatment in which an adhesion facilitating layer is formed. Among these, preferred are the coating treatment and alkaline treatment each forming the adhesion facilitating layer. In order to form the adhesion facilitating layer, there can be used various kinds of adhesion facilitating materials such as a polyol resin, a polycarboxylic resin and a polyester resin. The thickness of the adhesion facilitating layer is preferably usually about 0.001 to about 10 μm, more preferably about 0.001 to about 5 μm, and particularly preferably about 0.001 to about 1 μm.

<<Another Embodiment of Polarizing Plate>>

The polarizing plate of the present embodiment may be used in practical use as an optical film laminated with other optical layers. Although the optical layers are not particularly limited, one layer or two layers or more of optical layers which may be used for formation of a liquid crystal display device or the like such as a reflector, a transflective plate, a retardation plate (including a half wavelength plate and a quarter wavelength plate), and a viewing angle compensation film may be used. Particularly preferable polarizing plates are a reflection type polarizing plate or a transflective type polarizing plate in which a reflector or a transflective reflector is further laminated on a polarizing plate of the present embodiment; an elliptically polarizing plate or a circular polarizing plate in which a retardation plate is further laminated on the polarizing plate; a wide viewing angle polarizing plate in which a viewing angle compensation film is further laminated on the polarizing plate; or a polarizing plate in which a brightness enhancement film is further laminated on the polarizing plate.

A reflective layer is provided on a polarizing plate to provide a reflection type polarizing plate, and this type of plate is used for forming a liquid crystal display device in which incident light from a view side (display side) is reflected to apply a display. This type of plate does not require built-in light sources such as a backlight, but has an advantage that a liquid crystal display device may easily be made thinner. The reflection type polarizing plate may be formed using appropriate methods such as a method in which a reflective layer made of metal or the like is, if required, attached to one surface of a polarizing plate through a transparent protective layer or the like.

<Pressure-Sensitive Adhesive Layer>

In the polarizing plate described above and the optical film including at least one polarizing plate (hereinafter, unless otherwise noted, the polarizing plate and the optical film are collectively referred to as a "polarizing plate"), a pressure-sensitive adhesive layer 7 may also be provided for adhesion with other members such as a liquid crystal cell. As pressure-sensitive adhesive which forms the pressure-sensitive adhesive layer is not particularly limited, and, for example, an acrylic type polymer; a silicone type polymer; polyester, polyurethane, polyamide, polyether; and fluorine type and rubber type polymers may be appropriately selected as a base polymer. Particularly, a pressure-sensitive adhesive such as an acrylic type pressure-sensitive adhesive may be preferably used, which has excellent optical transparency, shows pressure-sensitive adhesion properties such as moderate wettability, cohesiveness and adhesive, and has excellent weather resistance and heat resistance or the like.

In addition, a pressure-sensitive adhesive layer having low moisture absorption and excellent heat resistance is preferable. This is because those characteristics are required in order to prevent foaming and peeling-off phenomena by moisture absorption, in order to prevent a decrease in optical properties and curvature of a liquid crystal cell caused by thermal expansion difference or the like, and in order to manufacture a liquid crystal display device having high quality and excellent durability.

The pressure-sensitive adhesive layer may have conductivity. By applying conductivity to the pressure-sensitive adhesive layer, antistatic properties can be improved. An antistatic agent may also be suitably added in order to improve the antistatic properties. Examples of the antistatic agent include ionic surfactants, electrically-conductive polymers such as polyaniline, polythiophene, polypyrrole, and polyquinoxaline, and metal oxides such as tin oxide, antimony oxide, and indium oxide. The electrically-conductive polymers are preferably used from the viewpoint of optical properties, an appearance, an antistatic effect, and stability of an antistatic effect during heating or humidifying. Among these, water-dispersible or water-soluble electrically-conductive polymers such as polyaniline and polythiophene are particularly preferably used. When the water-soluble or water-dispersible electrically-conductive polymers are used as a material for forming the antistatic layer, organic solvent-induced deterioration of the polarizing plate can be suppressed in the coating process.

The pressure-sensitive adhesive layer may contain additives such as a natural or synthetic resin, and particularly a pressure-sensitive adhesive resin, a glass fiber, glass bead, metal powder, a filler containing other inorganic powder or the like, a pigment, a colorant, and an antioxidant. The pressure-sensitive adhesive layer may be a pressure-sensitive adhesive layer which contains fine particles and shows optical diffusivity.

An appropriate method may be carried out to attach a pressure-sensitive adhesive layer to one surface or both surfaces of a polarizing plate. Examples thereof include a method in which about 10 to about 40% by weight of a pressure-sensitive adhesive solution in which a base polymer or its composition is dissolved or dispersed in, for example, an appropriate solvent such as toluene or ethylacetate, or a mixed solvent of the solvents is prepared; and the solution is directly applied on a polarizing plate using appropriate developing methods such as a flow method and a coating method, or a method in which a pressure-sensitive adhesive layer is once formed on a separator, as described above, and is then transferred on a polarizing plate.

The pressure-sensitive adhesive layer may also be provided on one surface or both surfaces of a polarizing plate as a layer in which pressure-sensitive adhesives with different compositions or different kinds or the like are laminated together. When the pressure-sensitive adhesive layers are prepared on both surfaces, the pressure-sensitive adhesive layers which have different compositions, different kinds or thicknesses or the like may also be used on the front side and backside of the polarizing plate. The thickness of the pressure-sensitive adhesive layer may be appropriately determined depending on a purpose of usage or adhesive force or the like, and generally is 1 to 40 µm, preferably 5 to 30 µm, and particularly preferably 10 to 25 µm. When the thickness is less than 1 µm, the durability is poor. When the thickness is more than 40 µm, separation or peeling is likely to occur due to foaming or the like so that the appearance is degraded.

A separator is temporarily attached to the exposed surface of the pressure-sensitive adhesive layer to prevent contamination or the like, until it is practically used. This can prevent foreign matter from contacting the pressure-sensitive adhesive layer in usual handling. As the separator, without taking the above-mentioned thickness conditions into consideration, for example, appropriate conventional sheet materials which is coated, if necessary, with appropriate release agents such as silicone type, long chain alkyl type, and fluorine type release agents, and molybdenum sulfide may be used. As the appropriate conventional sheet materials, plastics films, rubber sheets, papers, cloths, nonwoven fabrics, nets, foamed sheets and metallic foils, or laminated sheets thereof may be used.

<Anchor Layer>

In order to increase the tackiness between the polarizing plate and the pressure-sensitive adhesive layer, an anchor layer 6 may be provided therebetween.

An anchoring agent selected from polyurethane, polyester, and polymers having an amino group in its molecule is preferably used as a material for forming the anchor layer. The polymers having an amino group in its molecule are particularly preferred. In the polymers having an amino group in its molecule, the amino group in the molecule makes interaction such as a reaction or ionic interaction with the carboxyl group or the like in the pressure-sensitive adhesive so that good tackiness is ensured.

Examples of the polymers having an amino group in its molecule include polymers of an amino group-containing monomer such as polyethyleneimine, polyallylamine, polyvinylamine, polyvinylpyridine, polyvinylpyrrolidine, and dimethylaminoethyl acrylate.

The anchor layer may have conductivity. By applying conductivity to the anchor layer, antistatic properties can be improved, and an antistatic agent can also be suitably added for the purpose of improving the antistatic properties. As the antistatic agent, the antistatic agents which may be contained in the pressure-sensitive adhesive layer can be suitably used.

In the present embodiment, the anchor layer may be a layer to which ultraviolet absorbing properties are applied by using methods such as a method including adding the ultraviolet absorber used for the first transparent protective film.

<<Liquid Crystal Display Device>>

The polarizing plate of the present embodiment may be preferably used for manufacturing various equipment such as a liquid crystal display device. The assembling of the liquid crystal display device may be carried out according to conventional methods. That is, the liquid crystal display device is generally manufactured by appropriately assembling component parts such as a liquid crystal cell, a polarizing plate and, if necessity, a lighting system, and by incorporating a driving circuit. In the present embodiment, except that the polarizing plate is used, there is particularly no limitation to use any conventional methods. Also any liquid crystal cell of arbitrary type such as TN type, STN type, π type, VA type, and IPS type may be used.

Appropriate liquid crystal display devices such as a liquid crystal display device in which the polarizing plate is disposed on one side or both sides of the liquid crystal cell, and in which a backlight or a reflector is used for a lighting system may be manufactured. In this case, the polarizing plate may be installed in one side or both sides of the liquid crystal cell. When providing the polarizing plates or optical films on both sides, they may be of the same type or of different type. Furthermore, in assembling the liquid crystal display device, appropriate parts such as a diffusion plate, an anti-glare layer, an antireflection film, a protective plate, a prism array, a lens array sheet, an optical diffusion plate, and a backlight, may be disposed in an appropriate position in one layer or two or more layers.

When a polarizing plate P in which the second transparent protective film 22 has a retardation is disposed on a liquid crystal cell C, the polarizing plate P is preferably disposed so that the second transparent protective film (equivalent to a retardation plate) 22 side is the liquid crystal cell C side. The polarizing plates P are preferably disposed on both sides of the liquid crystal cell C together with both the polarizing plates so that the second transparent protective film (retardation plate) 22 side is the liquid crystal cell C side. The case where the polarizing plates P are thus disposed is shown in FIG. 2.

Figure 2:
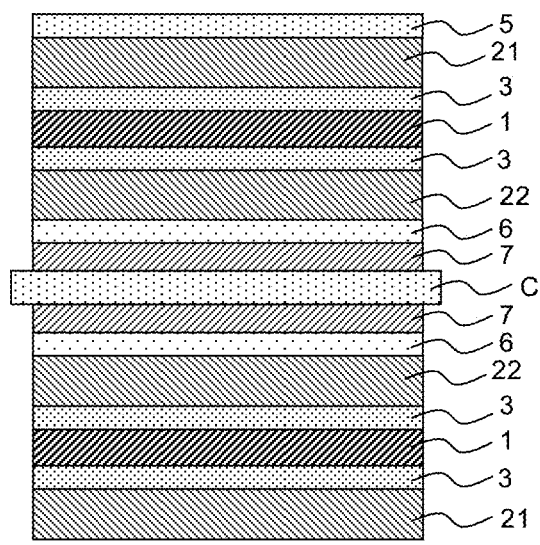
FIG. 2 is a sectional view schematically showing a liquid crystal display device in which the polarizing plate according to one embodiment of the present invention is applied to a liquid crystal cell.

As shown in FIG. 2, as the constitution of the liquid crystal display device, the polarizing plate is preferably disposed on each of both sides of the liquid crystal cell from the viewpoint of viewing angle properties. The polarizing plate P of the present embodiment can be applied to one side (particularly, view side, upper side in FIG. 2), and a film using a usual transparent protective film can be used as the polarizing plate on one side (lower side in FIG. 2).

EXAMPLES

Hereinafter, the construction and effect of the present invention will be schematically described with reference to Examples. However, the present invention is not limited thereto. Note that in each of Examples, part or parts and % are based on weight unless otherwise specified.

(Calculation of Imidization Ratio)

A resin was subjected to $^1$H-NMR measurement using $^1$H-NMR BRUKER AvanceIII (400 MHZ). When an area of a peak derived from the O—$CH_3$ proton of methyl methacrylate near 3.5 to 3.8 ppm was defined as A, and an area of a peak derived from the N—$CH_3$ proton of glutarimide near 3.0 to 3.3 ppm was defined as B, the ratio was obtained according to the following formula.

Im %={B/(A+B)}×100

The "imidization ratio" refers to the proportion of imide-carbonyl groups in whole carbonyl groups.

(Acid Value)

The acid value represents the content of a carboxylic acid unit or carboxylic anhydride unit in an imide resin. 0.3 g of a polymer sample was dissolved in a mixed solvent of 37.5 ml of methylene chloride and 37.5 ml of methanol to produce a solution, and two drops of a phenolphthalein ethanol solution were added to the solution. Then, 5 ml of a 0.1N sodium hydroxide aqueous solution was added to the solution. An excessive base was titrated with 0.1N hydrochloric acid, and the acid value was calculated according to a difference shown by milliequivalent between the added base and hydrochloric acid used before reaching neutralization.

(Production of Polarizer)

A polyvinyl alcohol film having an average polymerization degree of 2400, a saponification degree of 99.9% by mole, and a thickness of 75 μm was immersed in warm water at 28° C. for 60 seconds to be swelled. Next, the film was stretched to a stretching ratio of 3.3 while the film was dyed for 1 min in 3.2% by weight (weight ratio:iodine/potassium iodide=1/10) of an iodine solution at 30° C. Next, the film was stretched to a stretching ratio of 3.6 while the film was immersed in an aqueous solution containing 3% by weight of boric acid and 2% by weight of a potassium iodide at 60° C. for 10 seconds. Then, the film was stretched to a total stretching ratio of 6 while the film was immersed in an aqueous solution containing 4% by weight of boric acid and 3% by weight of potassium iodide at 60° C. for 0.5 min. The film was immersed in 5% by weight of a potassium iodide aqueous solution for 10 seconds for iodine ion immersion treatment. Then, the film was dried in an oven at 40° C. for 3 min to provide a polarizer having a thickness of 30 μm.

(Production of Transparent Protective Film)

Transparent Protective Film A (containing a glutarimide unit): An MS resin (MS-200; copolymer of methyl methacrylate/styrene (molar ratio) of 80/20, manufactured by Nippon Steel Chemical Co., Ltd.) was imidized with monomethylamine (imidization ratio: 5%). The obtained imidized MS resin had a glutarimide unit represented by the general formula (1) (wherein $R^1$ and $R^3$ represent a methyl group and $R^2$ represents a hydrogen atom), a (meth)acrylic ester unit represented by the general formula (2) ($R^4$ represents a hydrogen atom, and $R^5$ and $R^6$ represent a methyl group), a styrene unit, and an acid value of 0.5 mmol/g. An intermeshing co-rotating type twin-screw extruder having a bore diameter of 15 mm was used for imidization. The temperature of temperature control zones of the extruder was set to 230° C. The screw rotation speed was set to 150 rpm. The MS resin was fed to the extruder at a feed rate of 2.0 kg/hr. The amount of monomethylamine fed was 2 parts by weight relative to the MS resin. The MS resin was fed through a hopper of the extruder, and was melted in a kneading block of the extruder such that the kneading block was sufficiently charged with the resin thus melted. Thereafter, monomethylamine was injected through a nozzle of the extruder. A seal ring was placed in an end of the reaction zone such that the reaction zone was sufficiently charged with the resin. After the reaction, a by-product and an excess of methylamine were volatilized while the pressure exerted on a vent of the extruder was reduced to −0.08 MPa. The resin was extruded in a strand form through a die provided at an exit of the extruder. The resin thus extruded was cooled down in a water tank, and then was pelletized by a pelletizer. The imidized MS resin was melted and extruded to form a film. 0.66 parts by weight of an ultraviolet absorber ("T-712" manufactured by ADEKA) was supplied to 100 parts by weight of the MS resin. Next, the film was biaxially stretched to 2 times in a longitudinal direction and 2 times in a lateral direction to produce a transparent protective film (thickness: 40 μm, Re=2 nm, Rth=2 nm).

Transparent Protective Film B (containing a glutarimide unit): A transparent protective film B was produced in the same manner as in the procedure of the transparent protective film A except that a reaction time and a temperature were adjusted to set an imidization ratio to 2.5%.

Transparent Protective Film C (containing a glutarimide unit): A transparent protective film C was produced in the same manner as in the procedure of the transparent protective film A except that a reaction time and a temperature were adjusted to set an imidization ratio to 10%.

Transparent Protective Film D (containing a glutarimide unit): A transparent protective film D was produced in the same manner as in the procedure of the transparent protective film A except that a reaction time and a temperature were adjusted to set an acid value to 0.1 mmol/g.

Transparent Protective Film E (containing a glutarimide unit): A transparent protective film E was produced in the same manner as in the procedure of the transparent protective film A except that a reaction time and a temperature were adjusted to set an acid value to 3.0 mmol/g.

Transparent Protective Film F (containing a glutarimide unit): A transparent protective film F was produced in the same manner as in the procedure of the transparent protective film A except that an ultraviolet absorber was not compounded.

Transparent Protective Film G (containing a glutaric anhydride unit): A copolymer obtained by copolymerizing 20 parts by weight of methyl methacrylate and 80 parts by weight of acryl amide was further allowed to react with 27 parts by weight of methacrylic acid and 73 parts by weight of methyl methacrylate to obtain a copolymer (a). The copolymer (a) was then heated to perform an intramolecular cyclization reaction, thereby introducing the glutaric anhydride unit into the copolymer. The percentage of unsaturated carboxylic acid alkyl ester monomer unit:glutaric anhydride monomer unit:unsaturated carboxylic acid monomer unit was 71:28:1 (molar ratio) on the basis of all the units of the copolymer. As the obtained structure unit, $R^1$ and $R^2$ in the general formula (2) were methyl groups, and $R^6$ and $R^7$ in the following general formula (3) were methyl groups. The unsaturated carboxylic acid monomer unit was a structure unit derived from methacrylic acid. The weight-average molecular weight was 130,000.

[Formula 4]

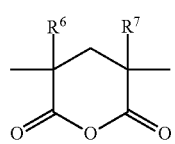

(3)

50 g of the obtained copolymer (a) and 150 g of 2-butanone were placed in a 300-ml separable flask equipped with a stirrer, and the mixture was stirred with a double helical ribbon stirring vane for 24 hours. The obtained solution was filtered with a glass filter of a 1-μm cut, whereby an acrylic resin solution was obtained. A part of the acrylic resin solution was placed on a glass plate with a polyethylene terephthalate film (thickness: 100 μm) fixed thereon, whereby a uniform film was formed using a bar coater. The film was then heated at 50° C. for 10 min to obtain an acrylic resin film. The obtained acrylic resin film was peeled from the polyethylene terephthalate film. The film was further heated at 100° C. for 10 min, at 120° C. for 20 min, 140° C. for 20 min, and 170° C. for 40 min, whereby a transparent protective film F (thickness: 40 μm, Re=0 nm, Rth=0 nm) was obtained.

Transparent Protective film H: A biaxial retardation film (thickness: 50 μm, Re=55 nm, Rth=151 nm, Nz=2.2) satisfying the relation of nx>ny>nz of a norbornene-based resin film (trade name: ZEONOR manufactured by Zeon Corporation) was used.

Transparent Protective film I: A biaxial retardation film (thickness: 40 μm, Re=55 nm, Rth=151 nm, Nz=2.2) satisfying the relation of nx>ny>nz of a norbornene-based resin film (trade name: ZEONOR manufactured by Zeon Corporation) was used.

Transparent Protective Film J: A triacetylcellulose film ("TD60UL" manufactured by Fuji Film, Re=10 nm, Rth=50 nm, water vapor permeability: 600 g/m²·24 hr) having a thickness of 40 μm and containing an ultraviolet absorber was used.

(Preparation of Adhesive)

Adhesive A (active energy ray curable): 50 parts of HEAA (hydroxyethyl acryl amide), 50 parts of ACMOL (acryloyl morpholine), and 0.3 parts of IRGACURE 184 were mixed for 1 hour, to prepare an adhesive A.

Adhesive B (water-based): At a temperature of 30° C., 100 parts of a polyvinyl alcohol-based resin having an acetoacetyl group (average degree of polymerization: 1200, degree of saponification: 98.5% by mole, degree of acetoacetylation: 5% by mole) and 50 parts of methylolmelamine were dissolved in pure water to prepare an aqueous solution adjusted to a solid concentration of 3.7%. Eighteen parts of an aqueous colloidal alumina solution (average particle size: 15 nm, solid concentration: 10%, positively charged) was added to 100 parts of the above aqueous solution to prepare an aqueous adhesive solution. The aqueous adhesive solution had a viscosity of 9.6 mPa·s and a pH in the range of 4 to 4.5. This was used as the adhesive B.

Example 1

(Production of Polarizing Plate)

The adhesive A was applied to one surface of the transparent protective film A so as to form an adhesive layer with a thickness of 80 nm after drying. The adhesive A was applied to one surface of the transparent protective film H so as to form an adhesive layer with a thickness of 80 nm after drying. The adhesive was applied at a temperature of 23° C., 30 min after its preparation. At a temperature of 23° C., the adhesive-coated transparent protective films A and H were then bonded to both surfaces of the polarizer with a roller machine, and then the laminate was appropriately irradiated with active energy rays from the transparent protective film H side, to cure the adhesive layers A and H located on both the sides, thereby producing a polarizing plate.

Examples 2 to 5 and Comparative Examples 1 to 5

Polarizing plates were produced in the same manner as in Example 1 except that the kinds of transparent protective films and the kinds of adhesives were changed as shown in Table 1 when the polarizing plate was produced in Example 1. In Example 5, an adhesive B was used as the adhesive. Adhesive-coated transparent protective films A and H were bonded to both surfaces of the polarizer with a roller machine, at a temperature of 23° C., and then dried at 55° C. for 10 min, to produce polarizing plates.

(Evaluation)

The obtained polarizing plates were evaluated as follows. The results are shown in Table 1.

(Appearance Evaluation: Burnt Deposit)

The produced polarizing plates were visually confirmed, and the presence or absence of burnt deposit (black spotty poor appearance) was confirmed. The case where the burnt deposit did not occur was evaluated as "◯", and the case where the burnt deposit occurred was evaluated as "x".

(Display Unevenness)

The polarizing plate was cut out to a size of 160 mm×90 mm so that the absorption axis of the polarizer was set to 45 degrees with respect to the long side. An acrylic pressure-sensitive adhesive layer was pasted on the surface of the laminated film (optical compensation layer side) of the polarizing plate. The pressure-sensitive adhesive layer-coated polarizing plate was pasted on each of both surfaces of a glass plate so that the absorption axes of the polarizing plates (polarizers) were perpendicular to each other, to produce a sample. The sample was subjected to a heating test (80° C., 100 hours) and a humidification test (60° C., 90% RH, 100 hours). After the tests, the sample was visually observed, and the luminance of the sample was measured.

Visual observation was evaluated as "◯" when display unevenness did not occur, and evaluated as "x" when display unevenness occurred.

The luminance was measured using a measurement machine (two-dimensional color distribution measurement apparatus CA-1500 (trade name) manufactured by Konica Minolta) set on a side of the sample opposite to the back light (at a position spaced apart from the upper plate by 50 cm) with the sample for test set on the back light. The luminance (A: $cd/m^2$) of a portion (dark part) viewed as unevenness, and the luminance (B: $cd/m^2$) of a portion (bright part) having no unevenness were measured to obtain a luminance ratio (A/B) for use as index. A larger luminance difference (A/B) value means that in-plane luminance unevenness is larger.

(Appearance Evaluation: Yellow Discoloration)

The polarizing plate was cut out to a size of 1000 mm×1000 mm, to prepare a sample. The polarizing plate of the sample was placed under the environment of a light resistance test set in JIS K 7350-2, and the presence or absence of the yellow discoloration of the polarizing plate in this case was confirmed. The case where yellow discoloration did not occur was evaluated as "◯", and the case where yellow discoloration occurred was evaluated as "x".

(Degree of Polarization of Polarizing Plate)

A sample was obtained by cutting the polarizing plate (100 mm×100 mm) in such a manner that the long side of the sample made an angle of 45 degrees with the absorption axis of the polarizing plate. The sample was measured for degree of polarization (%) with an integrating sphere type spectral transmittance meter (DOT-3C manufactured by Murakami Color Research Laboratory). The degree of polarization may be 99.990% or more, and is preferably 99.995% or more.

(Contrast of Panel)

A liquid crystal panel was produced according to the following procedure. This was mounted on a liquid crystal display device, to evaluate contrast.

<Mounting of Panel on Liquid Crystal Display Device>

A liquid crystal panel was extracted from a liquid crystal display device including a liquid crystal cell operated in an IPS mode (a liquid crystal panel (screen size: 32 inches) of liquid crystal television, model: 32LE7500 manufactured by LG Display Co., Ltd.). All optical films disposed above and below the liquid crystal cell were removed, to clean glass surfaces (back and front) of the liquid crystal cell. The liquid crystal cell thus produced was defined as a liquid crystal cell A. The produced polarizing plate described in each Example and Comparative Example was pasted on each of both surfaces of the liquid crystal cell A with an acrylic pressure-sensitive adhesive (thickness: 20 µm) interposed therebetween so that an absorption axis of the polarizer was located in a long side direction on a view side and an absorption axis of the polarizer was located in a short side direction on a back light side, to produce a liquid crystal panel A.

The obtained liquid crystal panel A was remounted on the liquid crystal display device in which the liquid crystal cell operated in an IPS mode (a liquid crystal panel (screen size: 32 inches) of liquid crystal television, model: 32LE7500 manufactured by LG Display Co., Ltd.) has been extracted.

<Measurement of Contrast>

Y values of XYZ indicator system in a front direction were measured in cases of displaying a white image and a black image by using EZ Contrast 160D (trade name) (manufactured by ELDIM) 30 min after turning on a backlight in a dark room (23° C., 55% R.H.). The contrast ratios in a front direction (YW/YB) were calculated from a Y value (YW: white luminance) in the white image and a Y value (YB: black luminance) in the black image. The contrast ratio may be 5000 or more, and is preferably 6000 or more.

TABLE 1

| | First transparent protective film | Second transparent protective film | Adhesive | Ultraviolet absorber | Physical properties of first transparent protective film | | | Evaluation | | | |
|---|---|---|---|---|---|---|---|---|---|---|---|
| | | | | | Content constitutional unit | Imidization ratio [%] | Acid value [mol/g] | Poor appearance (burnt deposit) | Display unevenness | Yellow discoloration of polarizing plate | Degree of polarization of polarizing plate [%] | Contrast of polarizing plate |
| Example 1 | A | H | A | Presence | Glutarimide | 5 | 0.5 | ◯ | ◯ | ◯ | 99.997 | 6000 |
| Example 2 | B | H | A | Presence | Glutarimide | 2.5 | 0.5 | ◯ | ◯ | ◯ | 99.997 | 6000 |
| Example 3 | D | H | A | Presence | Glutarimide | 5 | 0.1 | ◯ | ◯ | ◯ | 99.997 | 6000 |
| Example 4 | A | I | A | Presence | Glutarimide | 5 | 0.5 | ◯ | ◯ | ◯ | 99.997 | 6000 |
| Example 5 | A | H | B | Presence | Glutarimide | 5 | 0.5 | ◯ | ◯ | ◯ | 99.990 | 5000 |
| Comparative Example 1 | C | H | A | Presence | Glutarimide | 10 | 0.5 | X | ◯ | ◯ | 99.997 | 6000 |

TABLE 1-continued

| | First transparent protective film | Second transparent protective film | Adhesive | Ultraviolet absorber | Physical properties of first transparent protective film | | | Evaluation | | | | |
|---|---|---|---|---|---|---|---|---|---|---|---|---|
| | | | | | Content constitutional unit | Imidization ratio [%] | Acid value [mol/g] | Poor appearance (burnt deposit) | Display unevenness | Yellow discoloration of polarizing plate | Degree of polarization of polarizing plate [%] | Contrast of polarizing plate |
| Comparative Example 2 | E | H | A | Presence | Glutarimide | 5 | 3 | X | ○ | ○ | 99.997 | 6000 |
| Comparative Example 3 | F | H | A | Absence | Glutarimide | 5 | 0.5 | ○ | ○ | X | 99.997 | 6000 |
| Comparative Example 4 | G | H | A | Presence | Glutaric anhydride | — | — | X | ○ | ○ | 99.997 | 6000 |
| Comparative Example 5 | A | J | A | Presence | Glutarimide | 5 | 0.5 | ○ | X | ○ | 99.997 | 6000 |

(Discussion)

Examples 1 to 5 could prevent the burnt deposit of the first transparent protective film of the polarizing plate, suppress display unevenness and yellow discoloration even when the film was applied to the liquid crystal panel, and provide good optical properties. Comparative Example 1 caused the burnt deposit of the first transparent protective film since the imidization ratio of the first transparent protective film was too high. Comparative Example 2 caused the burnt deposit of the first transparent protective film since the acid value was too high. Comparative Example 3 caused the yellow discoloration of the polarizing plate since the first transparent protective film contained no ultraviolet absorber. Comparative Example 4 caused the burnt deposit of the first transparent protective film since the first transparent protective film contained no glutarimide unit. Comparative Example 5 used the triacetylcellulose film as the second transparent protective film, which advanced moisture absorption to cause display unevenness. When Examples 1 to 4 were compared with Example 5, the water-based adhesive was used in Example 5, which caused slight deterioration in the optical properties of the polarizing plate. Therefore, it is found that both the water-based adhesive and the active energy-ray curing-type adhesive can be practically used as the adhesive, but the active energy-ray curing-type adhesive is preferably used for providing a high-grade polarizing plate.

What is claimed is:

1. A polarizing plate comprising:
a polyvinyl alcohol-based polarizer; and
transparent protective films provided on both surfaces of the polyvinyl alcohol-based polarizer with an adhesive layer interposed between each of the transparent protective films and the polyvinyl alcohol-based polarizer,
wherein:
the transparent protective films are a first transparent protective film and a second transparent protective film;
the first transparent protective film contains a (meth) acrylic resin and an ultraviolet absorber, the (meth) acrylic resin having an unsaturated carboxylic acid alkyl ester unit and a glutarimide unit represented by formula (1), having an imidization ratio of 2.5 to 5.0% and an acid value of 0.10 to 0.50 mmol/g, and having an acrylic ester unit of less than 1% by weight, and; the second transparent protective film contains a cycloolefin-based resin, said formula 1 is

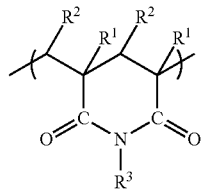

wherein:
$R^1$ and $R^2$ each independently represent hydrogen or an alkyl group having 1 to 8 carbon atoms; and
$R^3$ represents an alkyl group having 1 to 18 carbon atoms, a cycloalkyl group having 3 to 12 carbon atoms, or an aryl group having 6 to 10 carbon atoms.

2. The polarizing plate according to claim 1, wherein the first transparent protective film has an in-plane retardation of 40 nm or less and a thickness-direction retardation of 40 nm or less.

3. The polarizing plate according to claim 1, wherein the adhesive layer is made of an active energy-ray curing-type adhesive.

4. The polarizing plate according to claim 1, further comprising a coating layer disposed on one surface of the first transparent protective film.

5. The polarizing plate according to claim 4, wherein the coating layer is a hard coat layer or an antifouling layer.

6. The polarizing plate according to claim 1, further comprising a pressure-sensitive adhesive layer provided on at least one surface of the first and second transparent protective films opposite to the polarizer.

7. The polarizing plate according to claim 6, further comprising an anchor layer provided between the polarizing plate and the pressure-sensitive adhesive layer.

8. The polarizing plate according to claim 7, wherein the anchor layer has conductivity.

9. The polarizing plate according to claim 6, wherein the pressure-sensitive adhesive layer has conductivity.

10. A liquid crystal display device comprising the polarizing plate according to claim 1.

* * * * *